(12) United States Patent
Conwell

(10) Patent No.: US 6,945,514 B1
(45) Date of Patent: Sep. 20, 2005

(54) VEHICLE RAMP SYSTEM

(76) Inventor: Richard Conwell, 5009 E. 33rd St., Tulsa, OK (US) 74135

( * ) Notice: Subject to any disclaimer, the term of this patent is extended or adjusted under 35 U.S.C. 154(b) by 0 days.

(21) Appl. No.: 10/834,434

(22) Filed: Apr. 29, 2004

Related U.S. Application Data

(62) Division of application No. 10/163,226, filed on Jun. 5, 2002, now abandoned.

(51) Int. Cl.[7] ................................................ E02C 3/00
(52) U.S. Cl. ........................................................ 254/88
(58) Field of Search .............................. 188/32, 36, 74; 152/213 R; 254/88, 90; 14/69.5

(56) References Cited

U.S. PATENT DOCUMENTS

| | | | | |
|---|---|---|---|---|
| 2,723,005 A | * | 11/1955 | Wink | 188/32 |
| D228,301 S | | 9/1973 | Lundman | |
| D232,020 S | | 7/1974 | Borsuk | |
| 3,917,226 A | * | 11/1975 | Palmer | 254/88 |
| 4,013,268 A | | 3/1977 | Williams | |
| 4,421,300 A | | 12/1983 | Lundman | |
| 4,993,685 A | | 2/1991 | Sparling | |
| 5,118,081 A | | 6/1992 | Edelman | |
| 5,324,004 A | | 6/1994 | Richardson | |
| 5,446,937 A | | 9/1995 | Haskins | |
| 5,544,861 A | | 8/1996 | Wisner et al. | |
| 5,781,954 A | | 7/1998 | Mayer | |
| 5,863,026 A | | 1/1999 | Gano et al. | |
| 5,894,618 A | | 4/1999 | Jacobsen et al. | |
| 6,206,346 B1 | | 3/2001 | Johnson et al. | |
| 6,314,602 B1 | | 11/2001 | Wallen | |

* cited by examiner

*Primary Examiner*—Robert C. Watson
(74) *Attorney, Agent, or Firm*—Molly D. McKay

(57) ABSTRACT

A vehicle ramp system for elevating a vehicle off the ground. Tires on one end of a vehicle are driven onto a first set of modified ramps. Each of the modified ramps has an extended elevated horizontal platform and the vehicle's tires are rolled to the terminal end of the elevated platform of the first set of ramps. A second set of ramps is then placed on the opposite side of a second set of tires that are provided on the opposite end of the same vehicle. The vehicle is then reversed in direction so that the second set of tires rolls up onto the second set of ramps until the second set of tires rest on elevated platforms provided on the second set of ramps and the first set of tires are retained on the platform of the first set of ramps.

4 Claims, 2 Drawing Sheets

VEHICLE RAMP SYSTEM

CROSS-REFERENCE TO RELATED APPLICATIONS

The present application is a divisional application of U.S. patent application Ser. No. 10/163,226 entitled Vehicle Ramp System, filed on Jun. 5, 2002 now abandoned.

BACKGROUND OF THE INVENTION

1. Field of the Invention

The present invention relates to a vehicle ramp system for elevating all four wheels and tires of a vehicle off of the ground or floor so that there is sufficient clearance under the vehicle for a person to easily crawl under the vehicle to work on it, even if the vehicle is a street rod, muscle car, or other type of specialty car that is low slung and has a small ground clearance between the bottom of the vehicle and the ground when the vehicle is resting on a level ground. More specifically, the present invention employs a first set of ramps of extended length that have an extended elevated horizontal platform. A first set of vehicle tires located on one end of the vehicle is retained on the platform of the first set of ramps while the set of vehicle tires located on the opposite end of the vehicle are rolled onto an elevated platform on a second set of ramps that are placed on the opposite side of the second set of tires after the first set of tires are positioned at the terminal end of the first set of ramps.

2. Description of the Related Art

Automobile enthusiasts who like to build or work on their own vehicles, such as people who own a street rod, muscle car, or other type of specialty car, need to be able to elevate all four wheels and tires of their vehicle completely off the ground or floor so that they can crawl under the vehicle to work on the underside of the vehicle. These people need to have a system that is inexpensive and portable and that is usable at their home or in their personal garage so that they can enjoy working on their vehicle during their spare time. The system for elevating their vehicle has to lift the vehicle a sufficient distance from the ground without causing the vehicle to drag the ground as the vehicle is driven onto or off of the equipment used to elevate the vehicle. This is particularly important for vehicles that are low slung and have small ground clearance between the bottom of the vehicle and the ground when the vehicle is resting on a level ground.

Various apparatus for lifting a vehicle off of the ground are currently in use. One popular apparatus for this purpose is taught in U.S. Pat. No. 6,206,346. This patent teaches a pair of ramps that are pivotally attached on one end of the ramps to an elevated base and the opposite second end of the ramps are alternately lowered to the ground so that a vehicle can be driven onto the ramps, as illustrated in FIG. 2 of the patent. Once the vehicle is positioned on the ramps, the second ends of the ramps are raised by means of a jack to sit on a movable leg pivotally attached at the second end. One of the problems with this type of apparatus is that the ramps and base are fairly heavy and can not easily be removed from the garage nor stored out of the way.

Also, various vehicle ramps for use with individual tires are in use. These vary from the basic vehicle ramps for individual tires as taught for example in U.S. Pat. No. 4,421,300, to modifications on the basic vehicle ramp such as taught in U.S. Pat. Nos. 4,993,685; and 6,314,602. The basic ramp design consists of an inclined surface that allows a tire to be rolled up the inclined surface to reach either a flat or concave upper platform upon which the tire comes to rest. U.S. Pat. No. 4,993,685 adds an elongated web on the ground in front of the inclined surface to prevent the tire from scooting the ramp on the ground when the tire begins to engage the inclined surface. U.S. Pat. No. 6,314,602 teaches use of two sets of ramps so that all four tires of a vehicle can be simultaneously rolled onto the ramps. However, the ramps employed as the front set of ramps have to be modified to allow this type of usage. The front set of ramps are low profile and have the capability to be raised with a jack, as illustrated in FIG. 6 of the patent. If the front set of ramps where not low in profile, the automobile would high center on the front set of ramps as it was driven onto or off of the ramps.

The present invention allows all four tires of an automobile to be raised and lowered off of the ground by engaging the tires with special individual tire ramps without having to use jacks to lift the ramps and without danger of the ramps engaging the bottom of the vehicle when the vehicle is driving onto and off of the ramps.

SUMMARY OF THE INVENTION

The present invention is a vehicle ramp system for elevating all four wheels and tires of a vehicle off of the ground or floor so that there is sufficient clearance under the vehicle for a person to easily crawl under the vehicle to work on it, even if the vehicle is a street rod, muscle car, or other type of specialty car that is low slung and has a small ground clearance between the bottom of the vehicle and the ground when the vehicle is resting on a level ground.

More specifically, the present invention employs a modified elongated first set of ramps of extended length that have an extended elevated horizontal platform. A first set of vehicle tires located on one end of the vehicle are rolled up onto the elevated platform of the first set of ramps and rolled to the terminal end of the elevated platform of the first set of ramps.

Next, a second set of ramps is place on the opposite side of a second set of tires provided on the opposite end of the same vehicle. The vehicle is then reversed in direction so that each tire of the second set of tires rolls up on to one of the ramps of the second set until each of the second set of tires rests on a elevated platform provided on each of the second set of ramps. The first set of tires are retained on the platform of the first set of ramps as the second set of tires are rolled onto the platform of the second set of ramps and after the second set of tires come to rest on the second set of ramps.

DETAILED DESCRIPTION OF THE PREFERRED EMBODIMENT INVENTION

Figure 1:
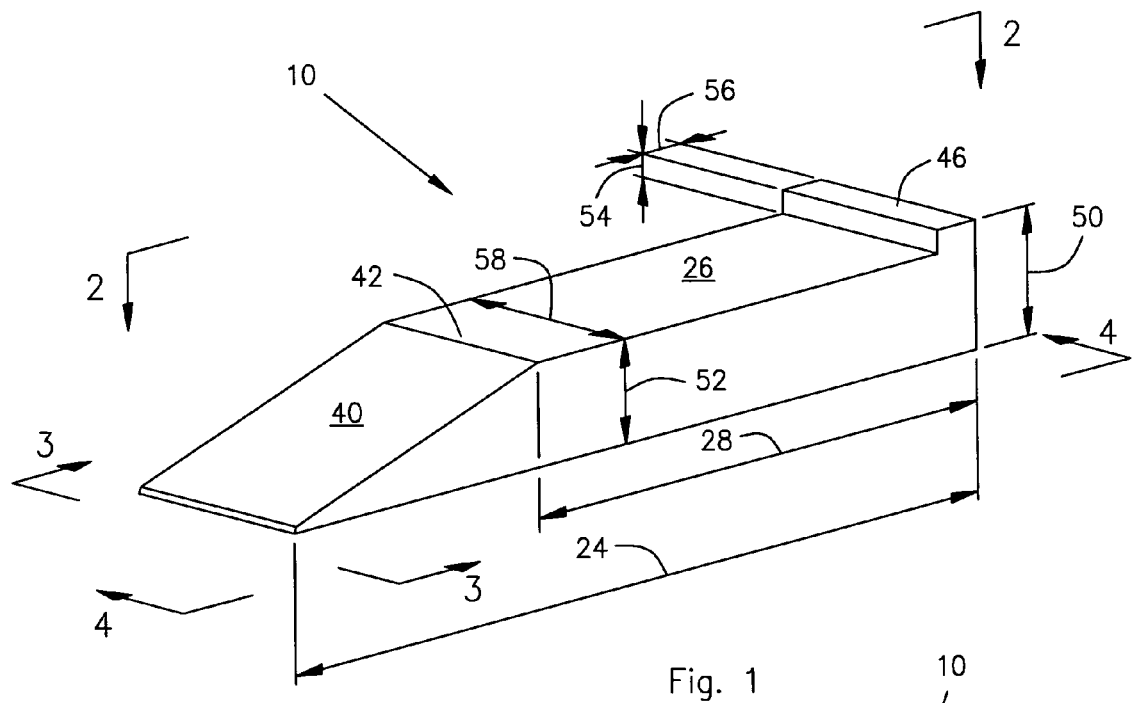
FIG. 1 is a perspective view of a vehicle ramp with an elongated elevated platform constructed in accordance with a preferred embodiment of the present invention and employed in the vehicle ramp system of the present invention.
Figure 2:
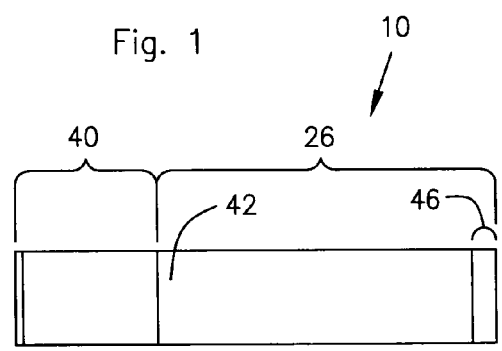
FIG. 2 is a top plan view of the vehicle ramp of FIG. 1 taken along line 2—2 of FIG. 1.
Figure 3:
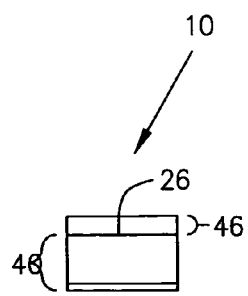
FIG. 3 is a front plan view of the vehicle ramp of FIG. 1 taken along line 3—3.
Figure 4:
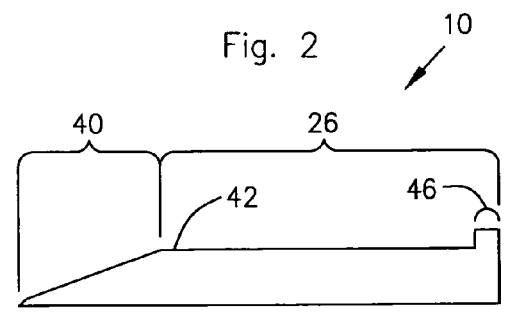
FIG. 4 is a side view of the vehicle ramp of FIG. 1 taken along line 4—4.

Referring now to drawings and initially to FIGS. 1–4, there is illustrated an elongated vehicle ramp 10 that is constructed in accordance with a preferred embodiment of the present invention. A first pair or set 12 of the elongated ramps 10 is shown in use in association with the vehicle ramp system illustrated in FIGS. 5–7. The vehicle ramp system is employed to elevate all four wheels and tires 30 and 34 of a vehicle 14 so that there is sufficient elevated clearance, as indicated by numeral 16 in FIG. 7, between a bottom 18 of the vehicle 14 and the ground 20 for a person to easily crawl under the vehicle 14 to work on it.

Figure 5:
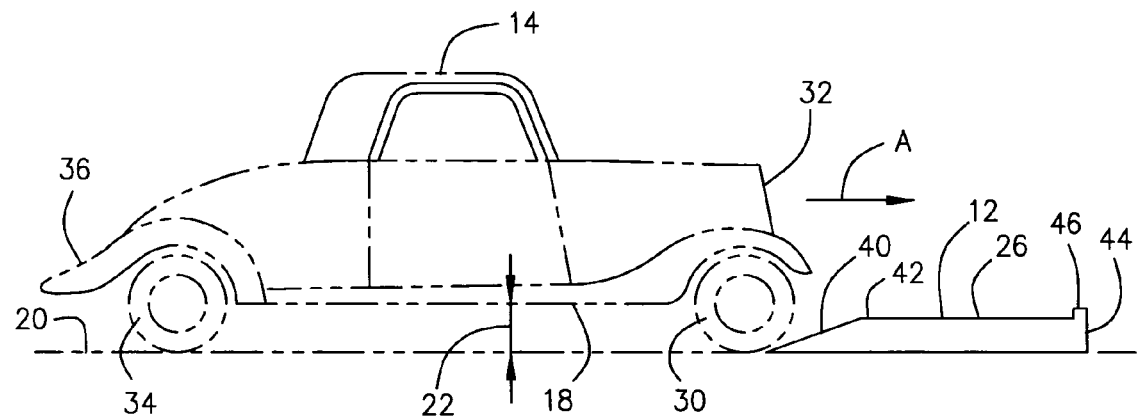
FIG. 5 is a side view of a vehicle with a set of the ramps from FIG. 1 placed in front of a first set of tires of the vehicle.

This system is useful even if the vehicle 14 is a street rod, muscle car, or other type of specialty car that is low slung and has small initial clearance, as indicated by numeral 22 in FIG. 5, between the bottom 18 of the vehicle 14 and the ground 20 when the vehicle 14 is resting on level ground 20. The vehicle ramp system employs at least two elongated vehicle ramps 10 as the first pair or set 12 of ramps 10. A second set 12' of ramps 10' employed in the vehicle ramp system may be either another set of elongated vehicle ramps 10 or may be a set of any suitable existing vehicle ramps.

Figure 6:
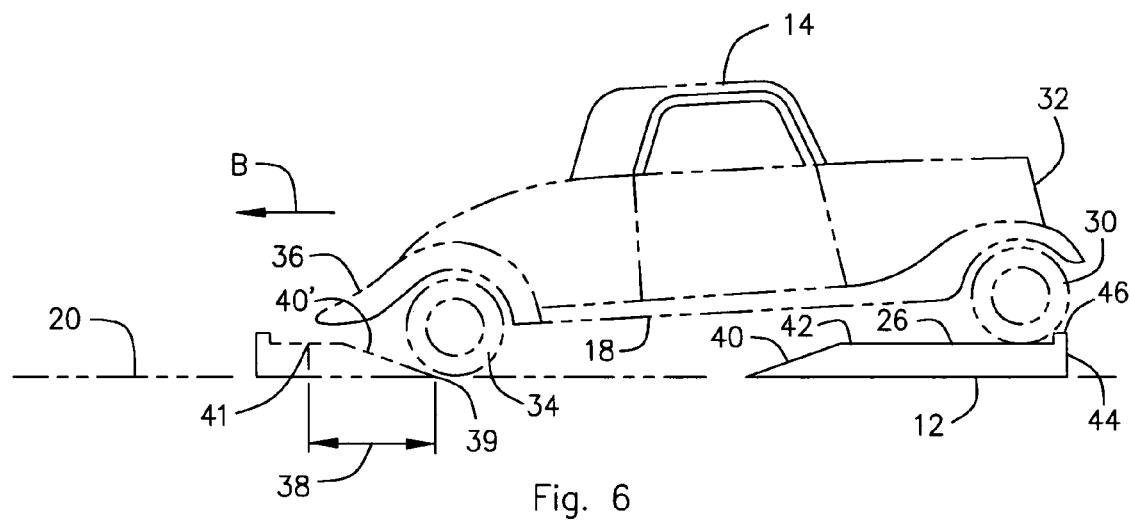
FIG. 6 is a side view of the vehicle of FIG. 5 showing the vehicle positioned so that the first set of tires are located at the terminal end of the elevated platform of the first set of ramps and showing a second set of ramps being placed on an opposite side of a second set of tires provided on the opposite end of the same vehicle.
Figure 7:
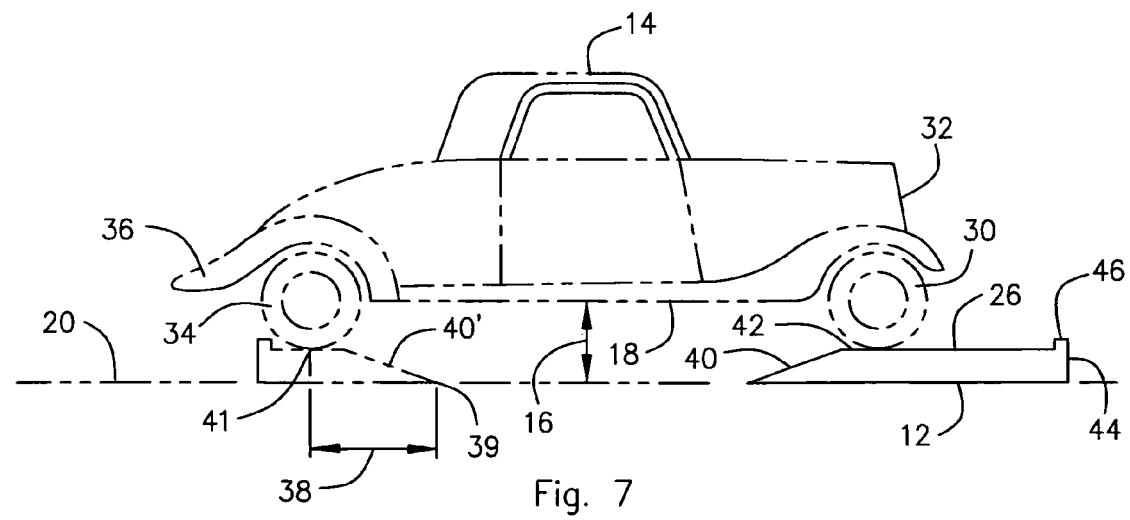
FIG. 7 is a side view of the vehicle of FIGS. 4 and 5 showing the vehicle positioned so that the second set of tires are located on the elevated platform of a second set of ramps while the first set of tires are retained on the elongated elevated platform of the first set of ramps, thus completely elevating all four wheels and tires of the vehicle on the two sets of ramps.

Each of the elongated ramps 10 is extended in total length 24 so it has an elevated elongated horizontal platform 26 of extended length 28. It is critical to this invention that the platform 26 of the ramps 10 have an extended length 28 and that the length 28 of the platform 26 is sufficiently long to allow a first set 30 of tires that are located on a first end 32 of the vehicle 14 to remain on the platforms 26 of the ramps 10 as a second set 34 of tires provided on an opposite second end 36 of the vehicle 14 rolls upon platforms 26' provided on the second set of ramps 12'. In order for the elongated platform 26 to be sufficiently long to allow this, the elongated platform 26 must be of a length 28 that is at least as long as the horizontal distance 38 from the tip 39 of the of the inclined surface 40' of the second set of ramps 12' to the desired stopping point 41 of the second set of tires 34 on the second set of ramps 12', as illustrated in FIG. 6.

The elongated ramps 10 are each provided with an inclined surface 40 adjoining a first end 42 the elongated platform 26. An opposite second or terminal end 44 of the platform 26 is preferably provided with an upwardly extending stop 46 to prevent the first set of tires 30 from rolling off of the terminal end 44 of the elevated platform 26.

Referring now again to FIG. 1, the following is an example of the dimensions for a ramp 10 that has been shown to be functional with a low slung vehicle 14. However, the ramps 10 of the present invention are not limited to these dimensions. These dimensions are given merely by way of example. One ramp 10 that has been successfully employed is one having a total length 24 of approximately 5 feet 10 inches, which includes an elongated platform having a platform length 28 of approximately 45 inches, including a stop 46 of a stop length 56 of approximately 1½ inches, and having a total height 50 of approximately 11 inches, which includes a platform height 52 of approximately 9 inches and a stop height 54 of approximately 2 inches. The ramp 10 is of a ramp width 58 of approximately 11½ inches.

Although the dimensions given above by way of example for the ramp 10 are generally somewhat variable, it is mandatory that the platform length 28 be at least 45 inches to enable the vehicle 14 to be driven onto the second set of ramps 12' without having the first set of tires 30 roll off of the elongated platform 26 provided on the first set of ramps 12.

USE OF THE INVENTION

As illustrated in FIG. 5, a first set 12 of elongated vehicle ramps 10 are positioned adjacent the first set of tires 30 so that the first set 12 of ramps 10 are aligned with the first set of tires 30 and extend toward the first end 32 of the vehicle 14. Then, as illustrated in FIG. 5 by arrows A, the vehicle 14 is driven in the direction of the first end 32 of the vehicle 14 until the first set of tires 30 have rolled up the inclined surface 40 of the first set 12 of ramps 10, rolled onto the elevated elongated horizontal platform 26 of the first set 12 of ramps 10, and come to rest with the first set of tires 30 resting at the terminal end 44 of the platform 26 so that the first set of tires 30 abut the stops 46.

Next as illustrated in FIG. 6, the second set of ramps 12' are positioned adjacent the second set of tires 34 so that the second set 12' of ramps are aligned with the second set of tires 34 and extend toward the second end 36 of the vehicle 14. Then, as illustrated in FIG. 6 by arrow B, the vehicle 14 is driven in the opposite direction, i.e. in the direction of the second end 36 of the vehicle 14, until the second set of tires 34 have rolled up the inclined surface 40' of the second set of ramps 12', rolled onto an elevated platform 26' of the second set of ramps 12' and come to rest with the second set of tires 34 resting on the platform 26' and with the first set of tires 30 remaining on the elongated platforms 26 of the ramps 10 of the first set of ramps 12.

In order to remove the vehicle 14 from the ramps 12 and 12', this procedure is reversed. That is the vehicle 14 is driven in the direction of Arrow A until the second set of tires 34 roll off of and disengage the second set of ramps 12'. The second set of ramps 12' is removed and the vehicle 14 is driven in the opposite direction, i.e. the direction of Arrow B until the first set of tires 30 roll off of and disengage the first set of ramps 12.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A method for reversibly elevating a vehicle employing a vehicle ramp system comprising the following steps:

a. positioning a first set of elongated vehicle ramps adjacent a first set of tires provided on a first end of a vehicle so that the first set of elongated vehicle ramps are aligned with the first set of tires and extend toward a first end of the vehicle, b. driving the vehicle in the direction of the first end of the vehicle until the first set of tires have rolled up an inclined surface provided on each of the first set of elongated ramps and have rolled to a terminal end of an elevated elongated horizontal platform provided on each of the first set of elongated ramps, c. positioning a second set of ramps adjacent the second set of tires so that the second set of ramps are aligned with the second set of tires and extend toward an opposite second end of the vehicle, and d. driving the vehicle in the direction of the second end of the vehicle until the second set of tires have rolled up an inclined surface provided on each of the second set of ramps and come to rest on an elevated platform provided on each of the second set of ramps while retaining the first set of tires on the elongated platforms of the first set of elongated ramps.

2. A method for reversibly elevating a vehicle employing a vehicle ramps system according to claim 1 further comprising the following steps:

e. driving the vehicle in the direction of the first end of the vehicle until the second set of tires has rolled off the second set of ramps, f. removing the second set of ramps from adjacent the second set of tires, and g. driving the vehicle in the direction of the second end of the vehicle until the first set of tires has rolled off of the first set of elongated ramps.

3. A method for reversibly elevating a vehicle employing a vehicle ramp system comprising the following steps:

a. placing an elongated vehicle ramp adjacent each tire provided on a first end of a vehicle so that each elongated vehicle ramp is aligned with its associated tire and extends toward a first end of the vehicle, b. driving the vehicle in the direction of the first end of the vehicle until each tire provided on the first end of the vehicle has rolled up an inclined surface of its associated elongated vehicle ramp and has rolled to a terminal end of an elevated elongated horizontal platform provided on each elongated vehicle ramp, c. placing a vehicle ramp adjacent each tire provided on a second end of the vehicle so that each vehicle ramp is aligned with its associated tire and extends toward a second end of the vehicle, and d. driving the vehicle in the direction of the second end of the vehicle until each tire provided on the second end of the vehicle has rolled up an inclined surface provided on each vehicle ramps and has come to rest on an elevated platform provided on each vehicle ramp while retaining each tire provided on the first end of the vehicle upon the elevated elongated horizontal platform of its associated elongated vehicle ramp.

4. A method for reversibly elevating a vehicle employing a vehicle ramps system according to claim 3 further comprising the following steps:

e. driving the vehicle in the direction of the first end of the vehicle until each tire provided on the second end of the vehicle has rolled off its associated vehicle ramp, f. removing each vehicle ramp from adjacent its associated tire provided on the second end of the vehicle, and g. driving the vehicle in the direction of the second end of the vehicle until each tire provided on the first end of the vehicle has rolled off its associated elongated ramp.

\* \* \* \* \*